United States Patent
Xiao et al.

(10) Patent No.: US 11,049,462 B2
(45) Date of Patent: Jun. 29, 2021

(54) METHOD FOR REMOVING BACKLIGHT MURA

(71) Applicant: Shenzhen China Star Optoelectronics Technology Co., Ltd., Shenzhen (CN)

(72) Inventors: Guangxing Xiao, Shenzhen (CN); Yuhong Fu, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 443 days.

(21) Appl. No.: 16/097,281

(22) PCT Filed: Sep. 27, 2018

(86) PCT No.: PCT/CN2018/107818
§ 371 (c)(1),
(2) Date: Oct. 29, 2018

(87) PCT Pub. No.: WO2019/210641
PCT Pub. Date: Nov. 7, 2019

(65) Prior Publication Data
US 2021/0082357 A1 Mar. 18, 2021

(30) Foreign Application Priority Data
May 3, 2018 (CN) .......................... 201810416090.0

(51) Int. Cl.
*G09G 3/34* (2006.01)
*G02F 1/13357* (2006.01)

(52) U.S. Cl.
CPC ..... *G09G 3/3426* (2013.01); *G02F 1/133603* (2013.01); *G02F 1/133605* (2013.01);
(Continued)

(58) Field of Classification Search
CPC .............. G09G 3/3426; G09G 2360/16; G02F 1/133603; G02F 1/133605; G02F 1/133606; G02F 1/133611
See application file for complete search history.

(56) References Cited

U.S. PATENT DOCUMENTS

2006/0214940 A1* 9/2006 Kinoshita ............ G09G 3/3208
345/589
2006/0279481 A1* 12/2006 Haruna .................... G09G 3/22
345/63

(Continued)

*Primary Examiner* — Amare Mengistu
*Assistant Examiner* — Jennifer L Zubajlo
(74) *Attorney, Agent, or Firm* — Leong C. Lei

(57) ABSTRACT

The present invention teaches a method for removing backlight mura. The method divides backlight into partitions, and divides each partition into units. The method then selects one of the partitions as a reference partition and selects the compensation values of the reference partition from all partitions. The method further calculates brightness difference values for all partitions other than the reference partition relative to the brightness of the reference partition. Finally, the method conduct brightness compensation to the other partitions based on the reference partition's compensation values, and the brightness difference values of the other partitions. The method may not only effectively eliminate backlight mura, but also allow the direct-lit backlight module to be thinner or of lower cost, and significant reduce storage requirement and logic resource.

8 Claims, 5 Drawing Sheets

(52) U.S. Cl.
CPC .. *G02F 1/133606* (2013.01); *G02F 1/133611* (2013.01); *G09G 2360/16* (2013.01)

(56) References Cited

U.S. PATENT DOCUMENTS

| | | | |
|---|---|---|---|
| 2014/0184671 A1* | 7/2014 | Lee | G09G 3/006 345/697 |
| 2014/0225943 A1* | 8/2014 | Shiobara | G09G 3/3607 345/694 |
| 2016/0027354 A1* | 1/2016 | Terai | G09G 3/36 345/87 |
| 2016/0253968 A1* | 9/2016 | Fu | G09G 3/003 345/694 |
| 2017/0193933 A1* | 7/2017 | Zhang | G09G 3/36 |

* cited by examiner

METHOD FOR REMOVING BACKLIGHT MURA

FIELD OF THE INVENTION

The present invention is generally related to the field of display technology and more particularly to a method for removing backlight mura.

BACKGROUND OF THE INVENTION

Liquid crystal display (LCD) devices are widely applied to TVs, mobile phones, personal digital assistants (PDAs), digital cameras, computer screens, and notebook screens, due to their thin thickness, high quality, power saving, and low radiation.

Currently most commercially available LCD devices are back-lighted LCD devices, which include a casing, a backlight module inside the casing, and a LCD panel inside the casing.

LCD panel includes a color filter (CF) substrate, a thin film transistor (TFT) array substrate, and a liquid crystal layer disposed between the two substrates. The LCD panel itself does not illuminate and is operate by applying driving voltages across the substrates to control the alignment of the liquid crystal molecules in the liquid crystal layer, and to refract light from the backlight module to produce pictures.

A backlight module may be categorized as edge-lit or direct-lit backlight module according to where backlight is incident into the LCD panel. A direct-lit backlight module provides a planar light source to the LCD panel by placing cold cathode fluorescent lamp (CCFL) or light emitting diode (LED) light bar behind the LCD panel. Direct-lit backlight modules are gaining popularity due to their smaller thickness, lower price, and superior optical uniformity.

As shown in FIG. 1, existing direct-lit backlight module includes a back plate 100, a reflection sheet 200 disposed on the back plate 100, a number of LED light bars 201 disposed on the reflection sheet 200, a diffusion sheet 300 disposed above the LED light bars 201, and an optical film set 400 covering the diffusion sheet 300. Each LED light bar 201 is configured with a number of LED lamps. As large-screen LCD TVs are gaining popularity, there is an increasing demand for thin and light backlight module. However, to make thinner direct-lit backlight module or to have thinner diffusion sheet for cost reduction based on the existing technology, mura (i.e., non-uniform brightness) may occur. Current solution to resolve mura on a direct-lit backlight module is to divide backlight into partitions of 6×6 pixels. That is, each partition covers 6×6 pixels. Then, brightness compensation is applied to each partition. Assuming that brightness is divided into 0~255 gray levels, and base compensation values for levels 12, 60, 120, and 192 are stored while compensation values for the other gray levels are obtained through linear interpolation based on the base compensation values, then, the amounts of data for mura brightness compensation to high definition (HD) and ultra-high definition (UD) LCD devices would be as follows.

HD: 7 bit×1366×768×4/(6×6)=816 Kbit
UD: 7 bit×3840×2160×4/(6×6)=6451 Kbit

Therefore, existing methods for resolving direct-lit backlight mura require too much memory space for storing the compensation data, and consume too much logic resources.

SUMMARY OF THE INVENTION

An objective of the present invention is to provide a method for removing direct-lit backlight mura. The method not only may remove backlight mura, but also may allow the direct-lit backlight module to have smaller thickness, lower cost, significantly reduced data amount, and less logic resource consumption.

To achieve the objective, the present invention teaches a method for removing backlight mura which includes the following steps.

Step S1: providing a LCD device, which includes a backlight module.

Step S2: dividing backlight from the backlight module into multiple partitions, and dividing each partition into multiple units, where each partition corresponds to multiple pixels, and each unit corresponds to a subset of the multiple pixels.

Step S3: obtaining brightness values for all partitions R by photographing the LCD device's screen.

Step S4: calculating compensation values for all partitions R based on their brightness values.

Step S5: selecting one of the partitions R as a reference partition, selecting the compensation values of the reference partition from all partitions' compensation values, and calculating difference values for all other partitions R other than the reference partition relative to the brightness values of the reference partition.

Step S6: based on the compensation values corresponding to the reference partition, and the difference value of each partition other than the reference partition calculated relative to the reference partition, conducting brightness compensation to each partition.

Step S5 would produce the following amount of data:

$$A \times B \times i \times 7 \text{ bit} + (N-1) \times \Delta b;$$

N is the total number of partitions and is a positive integer greater than one;

A×B is the number of units of a standard partition, and both A and B are positive integers greater than one;

i is the number of gray levels whose compensation values are used to determine the other gray levels' compensation values, and is a positive integer greater than one and less than 256.

$\Delta b$ is the number of bits for representing the difference values between the reference partition and the other partitions.

The backlight module includes a back plate, a reflection sheet disposed on the back plate, a number of LED light bars disposed on the reflection sheet, a diffusion sheet affixed to the back plate above the LED light bars, and an optical film set covering the diffusion sheet. Each LED light bar is configured with a number of LED lamps.

Selectively, each partition corresponds to a same number of pixels.

Selectively, some partitions correspond to more pixels than some other partitions do.

Selectively, within a partition, each unit corresponds to a same number of pixels.

Selectively, within a partition, some units correspond to more pixels than some other units do.

Selectively, difference value $\Delta$ for all partitions other than the reference partition relative to the brightness values of the reference partition is in the range $0 \leq \Delta \leq 15$; and $\Delta b$ is 4 bit.

Selectively, brightness compensation conducted in step S6 uses compensation values obtained using linear interpolation.

The advantages of the present invention are as follows. The present invention teaches a method for removing backlight mura. The method divides backlight into partitions, and divides each partition into units. The method then selects one of the partitions as a reference partition and selects the compensation values of the reference partition from all partitions. The method further calculates brightness difference values for all partitions other than the reference partition relative to the brightness of the reference partition. Finally, the method conduct brightness compensation to the other partitions based on the reference partition's compensation values, and the brightness difference values of the other partitions. The method may not only effectively eliminate backlight mura, but also allow the direct-lit backlight module to be thinner or of lower cost, and significant reduce storage requirement and logic resource.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

The following descriptions for the respective embodiments are specific embodiments capable of being implemented for illustrations of the present invention with referring to appended figures.

As shown in FIGS. 2 to 5, the present invention teaches a method for removing backlight mura, which includes the following steps.

Step S1: providing a LCD device, which includes a backlight module BLM.

Figure 1:
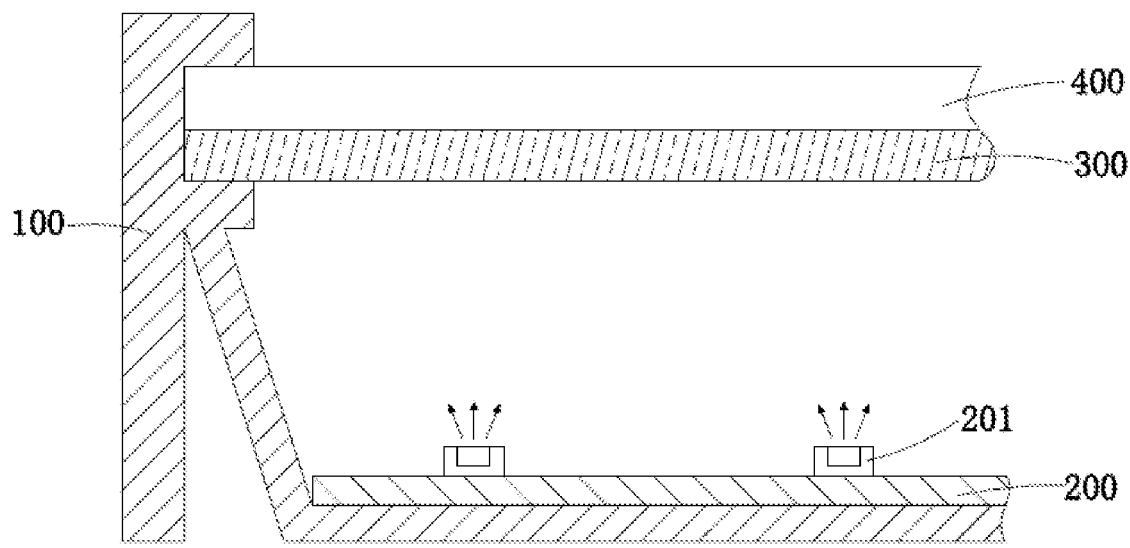
FIG. 1 is a schematic diagram showing a conventional direct-lit backlight module.
Figure 2:
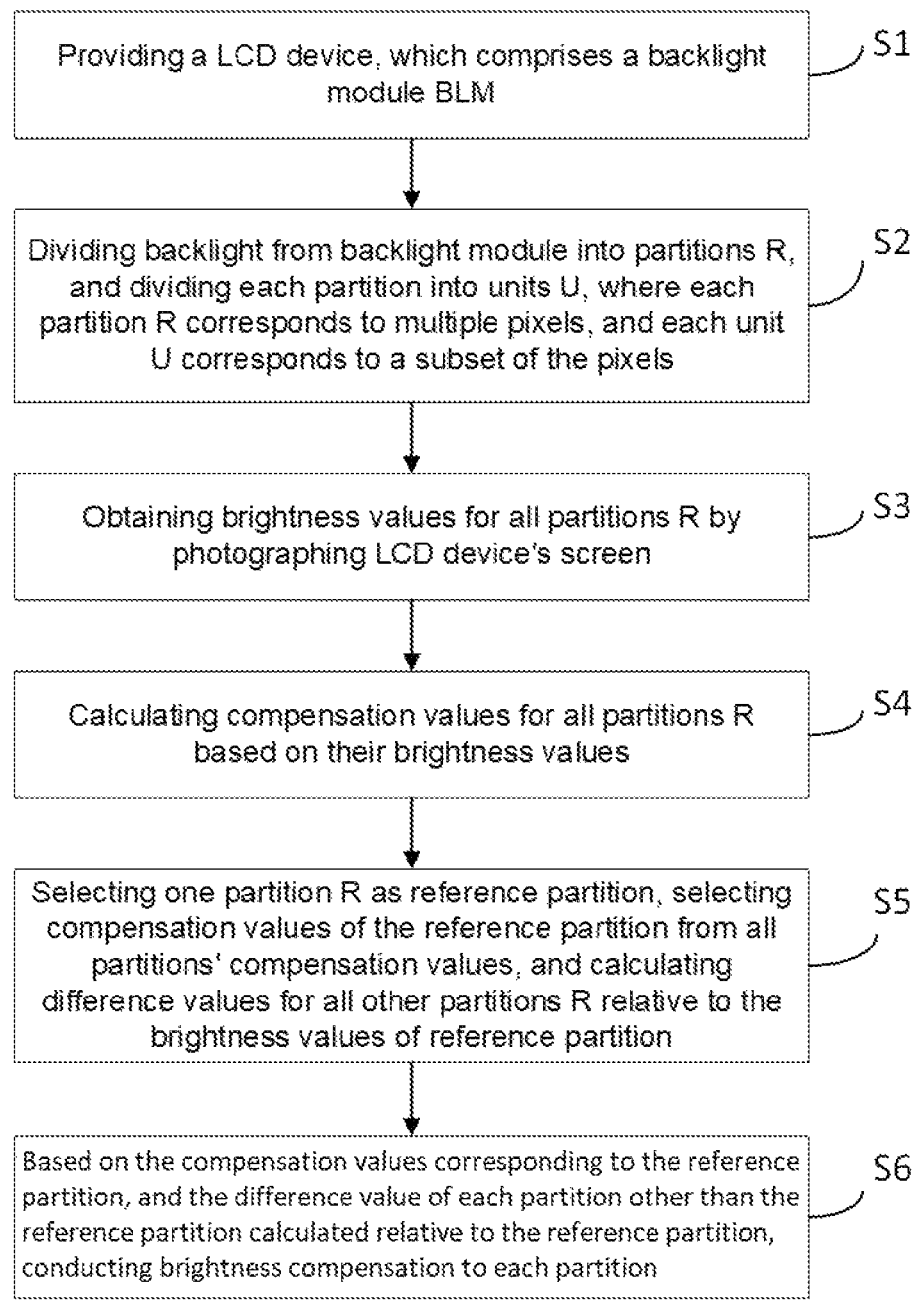
FIG. 2 is a flow diagram showing a method for removing backlight mura according to an embodiment of the present invention.
Figure 3:
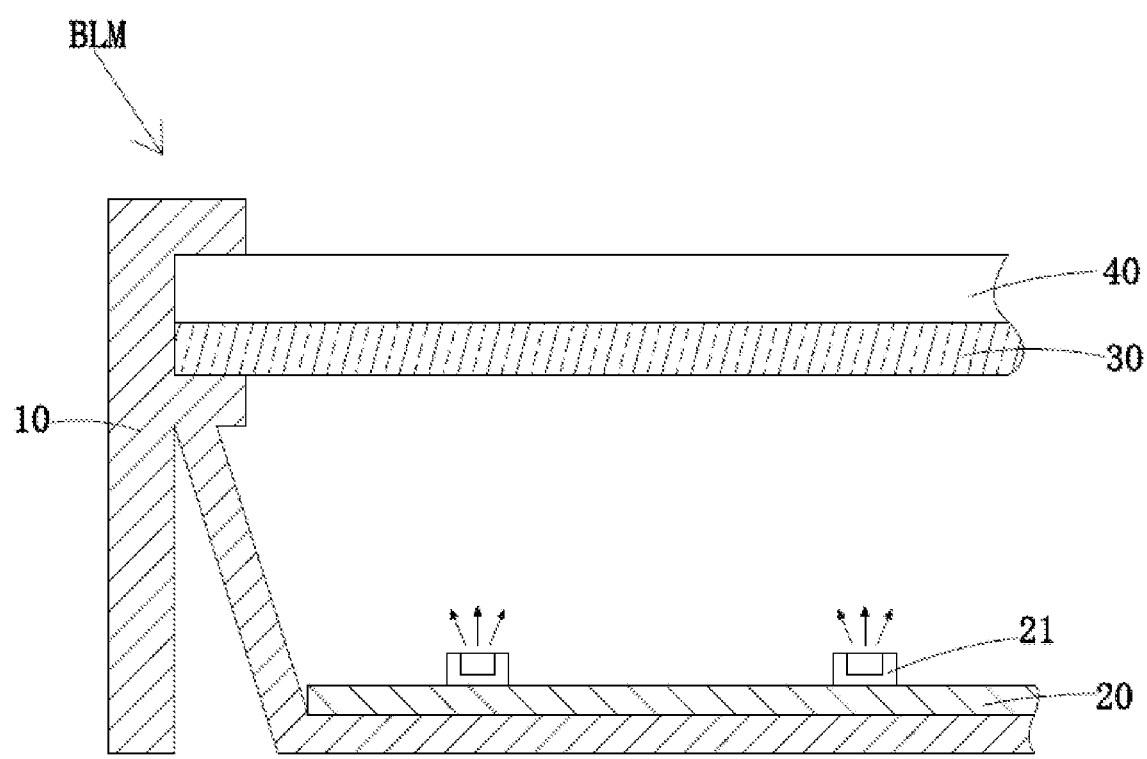
FIG. 3 is a schematic diagram showing a direct-lit backlight module provided by a step S1 of the method of FIG. 2.

Specifically, as shown in FIG. 3, the backlight module BLM is not limited to a direct-lit one, and includes a back plate 10, a reflection sheet 20 disposed on the back plate 10, a number of LED light bars 21 disposed on the reflection sheet 20, a diffusion sheet 30 affixed to the back plate 10 above the LED light bars 21, and an optical film set 40 covering the diffusion sheet 30. Each LED light bar 21 is configured with a number of LED lamps.

Figure 4:
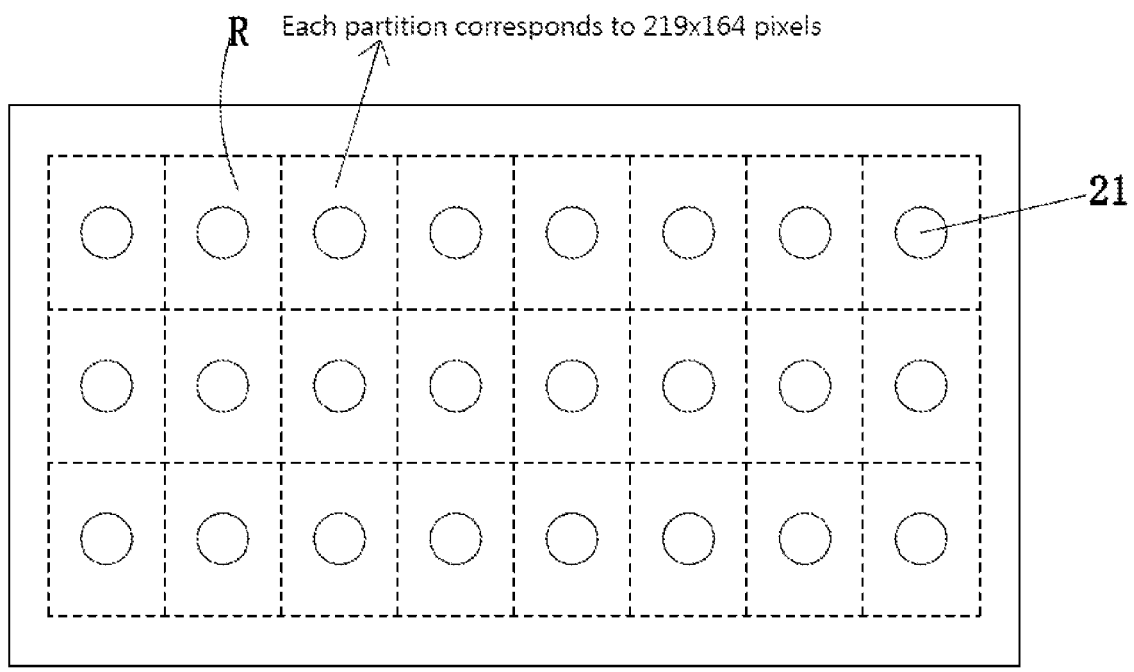
FIG. 4 is a schematic diagram showing the division of backlight into partitions by a step S2 of the method of FIG. 2.
Figure 5:
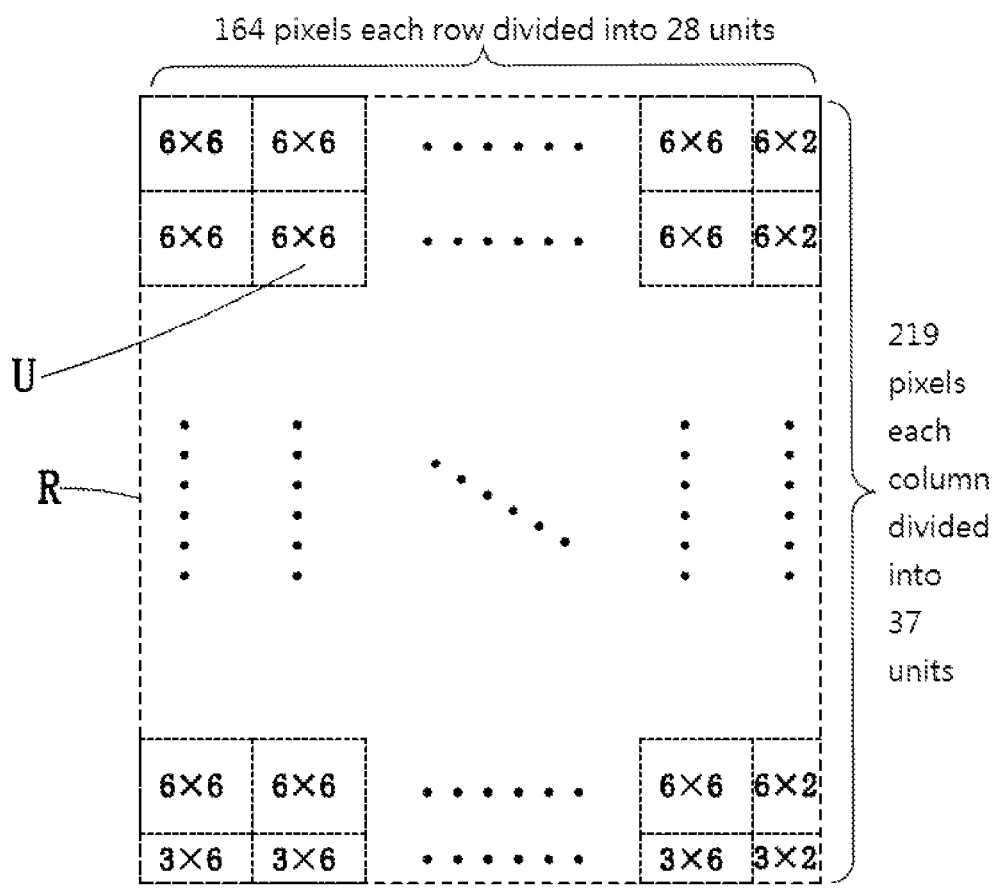
FIG. 5 is a schematic diagram showing the division of partition into backlight units by a step S2 of the method of FIG. 2.

To make thinner direct-lit backlight module or to have thinner diffusion sheet 30 for cost reduction based on the existing technology, mura is easier to occur. In step S2, as shown in FIGS. 4 and 5, backlight from the backlight module BLM is divided into multiple partitions R. Each partition R corresponds to multiple pixels. Each partition R is in turn divided into multiple units U. Each unit also corresponds to a number of pixels.

Specifically, each partition R may correspond to a same number of pixels. Using FIG. 4 as example, step S2 divides backlight from the direct-lit backlight module BLM into 24 partitions R. Each partition R corresponds to 219×164 pixels. Of course, when the LCD device has a total number of pixels not divisible by 219×164, some partitions R (usually those along the periphery of the LCD device) may correspond to less pixels than the other partitions R do.

Similarly, within a partition R, each unit U may correspond to a same number of pixels, or some units U may correspond to more pixels than the other units U do. Using FIG. 5 as example, each partition R corresponds to 219×164 pixels and each unit U corresponds to 6×6 pixels. When there are not enough pixels to make a 6×6 unit U, there are units having 6×2 pixels, 3×6 pixels, and 3×2 pixels. Finally, as shown in FIG. 5, the partition R is divided into 37×28 units.

Step S3: obtaining brightness values for all partitions R by photographing the LCD device's screen.

Step S4: calculating compensation values for all partitions R based on their brightness values.

Step S5: selecting one of the partitions R as a reference partition, selecting the compensation values of the reference partition from all partitions' compensation values, and calculating difference values for all other partitions R other than the reference partition relative to the brightness values of the reference partition.

Specifically, step S5 would produce the following amount of data:

$$A \times B \times i \times 7 \text{ bit} + (N-1) \times \Delta b;$$

7 bit is the number of bits for representing compensation value, where 1 bit is used for positive and negative sign, and the other 6 bits represent the magnitude of the value.

N is the total number of partitions R, and is a positive integer greater than one.

A×B is the number of units of a standard partition, and both A and B are positive integers greater than one.

i is the number of gray levels whose compensation values are used to determine the other gray levels' compensation values, and is a positive integer greater than one and less than 256. For example, if four levels (e.g., levels 12, 60, 120. and 192) are chosen and compensation values for the other gray levels are determined using compensation values of these four levels, then i is equal to 4.

Δb is the number of bits for representing the brightness difference between the reference partition and the other partitions R. Assuming that the other partitions R have a brightness difference Δ relative to the reference partition in the range 0≤Δ≤15, then Δb is 4 bit.

Following the example shown in FIGS. 4 and 5, step S5 would produce the following amount of data:

$$37 \times 28 \times 4 \times 7 \text{ bit} + (24-1) \times 4 \text{ bit} \approx 29 \text{ Kbit}$$

If existing method for removing direct-lit backlight mura using 6×6 pixels as partition is applied to the same example, the amount of data would be:

$$7 \text{ bit} \times 219 \times 164 \times 4 \times 24 / (6 \times 6) \approx 670 \text{ Kbit}$$

Therefore, the present invention is able to significantly reduce the amount of data produced, and the corresponding logic resource.

Step S6: conducting brightness compensation to each partition, where, for a partition R other than the reference partition, its brightness compensation is based on the compensation values of the reference partition, and its respective difference value relative to the reference partition, thereby removing direct-lit backlight mura.

Specifically, a partition R other than the reference partition has a compensation value=compensation value for the reference partition+the partition R's difference value.

Figure 6:
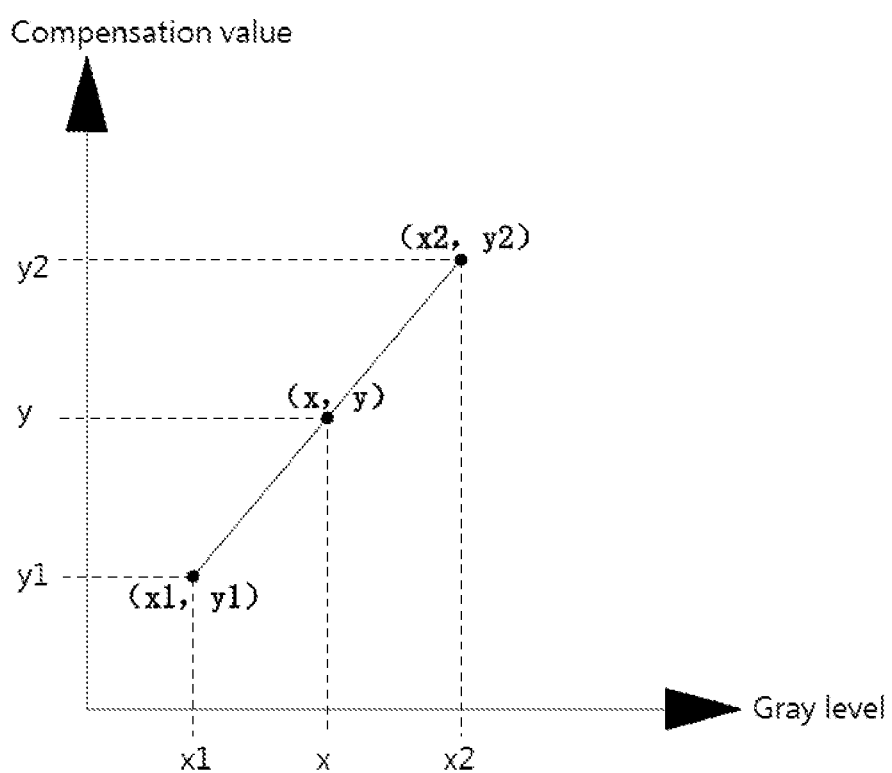
FIG. 6 is a schematic diagram showing linear interpolation of compensation values.

Linear interpolation is used to obtain compensation values. Using the previous example for step S5, four gray levels 12, 60, 120, 192 of the reference partition are selected. Then, each of the other partitions has compensation values for these four gray levels. As shown in FIG. 6, it is already known that gray level x1 has a compensation value y1 and gray level x2 has a compensation value y2. To obtain the compensation value y for any gray level x between x1 and x2, a point (x, y) is determined along a straight line between the points (x1, y1) and (x2, y2) using the following linear interpolation equation:

$$y=(x2-x)\times y1/(x2-x1)+(x-x1)\times y2/(x2-x1)$$

Then, brightness compensation is applied to the gray level x. Furthermore, the steps S2, S4, S5, and S6 are conducted by the timing controller (TCON) of the LCD device.

The method for removing backlight mura of the present invention may effectively eliminate mura for direct-lit backlight module. Therefore, the direct-lit backlight module may be made thinner, or thinner diffusion sheet of lower cost may be adopted without causing mura.

As described above, the method for removing backlight mura divides backlight into partitions, and divides each partition into units. The method then selects one of the partitions as a reference partition and selects the compensation values of the reference partition from all partitions. The method further calculates brightness difference values for all partitions other than the reference partition relative to the brightness of the reference partition. Finally, the method conduct brightness compensation to the other partitions based on the reference partition's compensation values, and the brightness difference values of the other partitions. The method may not only effectively eliminate backlight mura, but also allow the direct-lit backlight module to be thinner or of lower cost, and significant reduce storage requirement and logic resource.

Above are embodiments of the present invention, which does not limit the scope of the present invention. Any equivalent amendments within the spirit and principles of the embodiment described above should be covered by the protected scope of the invention.

What is claimed is:

1. A method for removing backlight mura, comprising
   S1: providing a liquid crystal display (LCD) device, which comprises a backlight module;
   S2: dividing backlight from the backlight module into a plurality of partitions, and dividing each partition into a plurality of units, where each partition corresponds to a plurality of pixels, and each unit corresponds to a subset of the plurality of pixels;
   S3: obtaining brightness values for all partitions by photographing the LCD device's screen;
   S4: calculating compensation values for all partitions based on their brightness values;
   S5: selecting one of the partitions as a reference partition, selecting the compensation values of the reference partition from all partitions' compensation values, and calculating difference values for all other partitions other than the reference partition relative to the brightness values of the reference partition; and
   S6: based on the compensation values corresponding to the reference partition, and the difference value of each partition other than the reference partition calculated relative to the reference partition, conducting brightness compensation to each partition;
   wherein step S5 achieves the following amount of data $A\times B\times i\times 7$ bit+$(N-1)\times \Delta b$;

N is the total number of partitions and is a positive integer greater than one;
   A×B is the number of units of a standard partition, and both A and B are positive integers greater than one;
   i is the number of gray levels whose compensation values are used to determine the other gray levels' compensation values, and is a positive integer greater than one and less than 256; and
   Δb is the number of bits for representing the difference values between the brightness of reference partition and the other partitions.

2. The method according to claim 1, wherein the backlight module is a direct-lit backlight module; the backlight module comprises a back plate, a reflection sheet disposed on the back plate, a plurality of lighting emitting diode (LED) light bars disposed on the reflection sheet, a diffusion sheet affixed to the back plate above the LED light bars, and an optical film set covering the diffusion sheet; and each LED light bar is configured with a plurality of LED lamps.

3. The method according to claim 1, wherein each partition corresponds to a same number of pixels.

4. The method according to claim 1, where some partitions correspond to more pixels than some other partitions do.

5. The method according to claim 1, wherein, within a partition, each unit corresponds to a same number of pixels.

6. The method according to claim 1, wherein, within a partition, some units correspond to more pixels than some other units do.

7. The method according to claim 1, wherein difference value Δ for all partitions other than the reference partition relative to the brightness values of the reference partition is in the range 0≤Δ≤15; and Δb is 4 bit.

8. The method according to claim 1, wherein brightness compensation conducted in step S6 uses compensation values obtained using linear interpolation.

* * * * *